US008783564B2

(12) United States Patent  (10) Patent No.: US 8,783,564 B2
Calabrese et al.  (45) Date of Patent: Jul. 22, 2014

(54) TRANSACTION NOTIFICATION AND AUTHORIZATION METHOD
(71) Applicants: Gerry Calabrese, Southwest Ranches, FL (US); Werner Stemer, Fort Lauderdale, FL (US)
(72) Inventors: Gerry Calabrese, Southwest Ranches, FL (US); Werner Stemer, Fort Lauderdale, FL (US)
(73) Assignee: Calabrese Stemer LLC, Hollywood, FL (US)
( * ) Notice: Subject to any disclaimer, the term of this patent is extended or adjusted under 35 U.S.C. 154(b) by 0 days.
(21) Appl. No.: 13/974,462
(22) Filed: Aug. 23, 2013
(65) Prior Publication Data
US 2013/0346312 A1 Dec. 26, 2013

Related U.S. Application Data

(60) Continuation of application No. 13/088,514, filed on Apr. 18, 2011, which is a continuation of application No. 12/043,235, filed on Mar. 6, 2008, now Pat. No. 7,954,706, which is a division of application No. 11/077,783, filed on Mar. 11, 2005, now Pat. No. 7,357,310.

(51) Int. Cl.
 *G06K 5/00* (2006.01)
(52) U.S. Cl.
 USPC .......................................... 235/380; 235/382
(58) Field of Classification Search
 USPC ............... 235/380, 382, 379; 705/77
 See application file for complete search history.

(56) References Cited

U.S. PATENT DOCUMENTS

| | | | |
|---|---|---|---|
| 5,221,838 A | 6/1993 | Gutman et al. | |
| 5,359,182 A | 10/1994 | Schilling | |
| 5,521,363 A | 5/1996 | Tannenbaum | |
| 5,530,438 A | 6/1996 | Bickham et al. | |
| 5,615,110 A | 3/1997 | Wong | |
| 5,708,422 A | 1/1998 | Blonder et al. | |
| 5,903,830 A | 5/1999 | Joao et al. | |
| 6,064,990 A | 5/2000 | Goldsmith | |
| 6,366,893 B2 | 4/2002 | Hannula et al. | |
| 6,442,532 B1 | 8/2002 | Kawan | |
| 6,494,367 B1 | 12/2002 | Zacharias | |
| 6,726,098 B2 | 4/2004 | Schilling | |
| 6,754,636 B1 | 6/2004 | Walker et al. | |
| 7,024,396 B2 | 4/2006 | Woodward | |

(Continued)

FOREIGN PATENT DOCUMENTS

| | | |
|---|---|---|
| EP | 0745961 A2 | 12/1996 |
| EP | 1067492 A3 | 1/2001 |

(Continued)

OTHER PUBLICATIONS

Saxena et al., "MMPS: A Versatile Mobile-to-Mobile Payment System", Proceedings of the International Conference on Mobile Business (ICMB'05), 2005, IEEE, pp. 1-6.
Wolfgang Wopperer, "Fraud Risks in E-commerce Transactions", The Geneva Papers on Risk and Insurance, vol. 27 No. 3 (Jul. 2002), pp. 383-394.
Amir Herzberg, "Payments and Banking with Mobile Personal Devices", Communications of the ACM, May 2003, vol. 46, No. 5, pp. 53-58.
Wang et al., "Secure Wireless Payment Protocol", Proceedings of International Conference on Wireless Networks (ICWN), Las Vegas, Nevada, 2003 pp. 1-7.

(Continued)

*Primary Examiner* — Ahshik Kim
(74) *Attorney, Agent, or Firm* — Werner H. Stemer

(57) ABSTRACT

An added level of security is provided for charge transactions. Upon presenting a charge card number for a purchase, for example, the cardholder receives a message (e.g., SMS) on his cell phone or PDA that a charge authorization request has been received. The message may include the merchant, a charge amount, and a time and date.

19 Claims, 2 Drawing Sheets

(56) References Cited

U.S. PATENT DOCUMENTS

| | | |
|---|---|---|
| 7,096,003 B2 | 8/2006 | Joao et al. |
| 7,181,432 B2 | 2/2007 | Wells et al. |
| 7,389,275 B2 | 6/2008 | Kemper et al. |
| 7,427,021 B2 | 9/2008 | Kemper et al. |
| 8,229,854 B2 | 7/2012 | Stephen et al. |
| 8,296,228 B1 | 10/2012 | Kloor |
| 2001/0051920 A1 | 12/2001 | Joao et al. |
| 2002/0035539 A1 | 3/2002 | O'Connell |
| 2002/0107755 A1 | 8/2002 | Steed et al. |
| 2002/0107791 A1 | 8/2002 | Nobrega et al. |
| 2002/0143634 A1* | 10/2002 | Kumar et al. ............ 705/18 |
| 2002/0156689 A1 | 10/2002 | Spalding |
| 2002/0161724 A1 | 10/2002 | Peters |
| 2003/0105707 A1 | 6/2003 | Audebert et al. |
| 2003/0221125 A1 | 11/2003 | Rolfe |
| 2006/0085337 A1 | 4/2006 | Conforti et al. |
| 2007/0027803 A1 | 2/2007 | Brandes et al. |

FOREIGN PATENT DOCUMENTS

| | | |
|---|---|---|
| EP | 1136961 A1 | 9/2001 |
| EP | 2287793 A1 | 2/2011 |
| FR | 2823882 A1 | 10/2002 |
| WO | 9914711 A2 | 3/1999 |
| WO | 0193213 A2 | 12/2001 |
| WO | 02082392 A2 | 10/2002 |
| WO | 03046778 A2 | 6/2003 |
| WO | 2005031541 A2 | 4/2005 |

OTHER PUBLICATIONS

Carol L. Clark, "Shopping without cash: The emergence of the e-purse", 4Q/2005, Economic Perspectives, pp. 34-51.

Hall et al., WPP: A Secure Payment Protocol for Supporting Credit- and Debit-Card Transactions Over Wireless Networks, IEEE International Conference on Telecomuniations (ICT), Bucharest, Jun. 2001, pp. 1-6.

Mark E. Peters, "Emerging eCommerce Credit and Debit Card Protocols", Proceedings of the 3rd International Symposium on Electronic Commerce (ISEC'02), 2002, IEEE Computer Society, 8 pages.

Karnouskos et al., "Mobile Payment: A Journey Through Existing Procedures and Standardization Initiatives" IEEE Communications Surveys, Fouth Quarter 2004, vol. 6, No. 4, pp. 44-66.

Vorapranee Khu-Smith, "Enhancing the security of electronic commerce transactions", Technical Report RHUL-MA-2003-7, Jun. 2003, Royal Holloway Univesity of London, Department of Mathematics, England, 183 pages.

Cai et al., "Authorization Mechanisms for Mobile Commerce Implementations in Enhanced Prepaid Solutions", Bell Labs Technical Journal 8(4), 2004, pp. 121-131.

Xingjiang Song, "Mobile Payment and Security", Article in T-110. 501 Seminar on Network Security 2001 ISBN 951-22-5807-2, Publications in Telecommunications Software and Multimedia TML-C7 ISSN 1455-9749, Helsinky University of Technology, Telecommunications Software and Multimedia Laboratory, 15 pages.

\* cited by examiner

US 8,783,564 B2

TRANSACTION NOTIFICATION AND AUTHORIZATION METHOD

CROSS-REFERENCE TO RELATED APPLICATIONS

This application is a continuation of patent application Ser. No. 13/088,514, filed Apr. 18, 2011; which was a continuation of patent application Ser. No. 12/043,235, filed Mar. 6, 2008, now U.S. Pat. No. 7,954,706 B2; which was a divisional of patent application Ser. No. 11/077,783, filed Mar. 11, 2005, now U.S. Pat. No. 7,357,310 B2; the prior applications are herewith incorporated by reference in their entirety.

BACKGROUND OF THE INVENTION

Field of the Invention

The invention lies in the financial transaction processing field. More specifically, the invention relates to credit and debit transactions and to related charge notification and charge authorization.

Credit cards and charge cards have become the primary vehicle by which payments for consumer services and consumer goods are transacted. In today's environment, credit payments are authorized at the point of sale (POS) and the authorization is provided by the cardholder's signature on a receipt. Often, the transaction is performed under considerable time pressure (e.g., in a long cash-out line) and mistakes are only recognized after the transaction has been completed. The consumer may, for example, have been charged too much, and he may have authorized the incorrect amount. As many consumers know, correcting such simple mistakes is not at all simple and the correction is time consuming and it is an expensive service for the credit card and credit clearing houses to maintain.

Mistakes such as the foregoing, however, are not the main reason for considerable losses. Often, incorrect or non-authorized charges are effected because of fraudulent or even innocent mistakes that could have been avoided, had better authorization security been assured. It is well known that charge errors and charge fraud causes millions of dollars in losses in the United States alone.

Extraneous authorization security, on the other hand, may be too intrusive in many cases and may even have a negative impact on the transaction.

SUMMARY OF THE INVENTION

It is accordingly an object of the invention to provide a credit card transaction notification and authorization method, which overcomes the above-mentioned disadvantages of the heretofore-known devices and methods of this general type and which provides for a non-intrusive, user-selectable notification and authorization system for credit card transactions.

With the above and other objects in view there is provided, in accordance with the invention, an improved charge payment authorization method. First, a charge is requested at a merchant's and account information for payment of a customer's purchase is acquired at the merchant's. Then an authorization request is transmitted to a remote charge processing facility, and the charge request is processed. This conventional process is improved as follows: a notification of the charge request is transmitted in the form of a SMS or text through a cellular network to a wireless device associated with the customer no later than immediately after authorizing the charge request and the charge request is processed without requiring a response from the wireless device associated with the customer, i.e., without waiting for an authorization from the customer.

With the foregoing and other objects in view there is provided, in accordance with the invention, a payment authorization method, which comprises:

gathering, at a merchant's, account information for payment of a customer's purchase;

transmitting an authorization request to a financial authorization system requesting payment authorization for the customer's purchase, the authorization request including the account information;

notifying the customer by sending a message to a communications device associated with the customer.

In accordance with an added feature of the invention, the gathering step comprises swiping a card presented by the customer and containing the account information.

With the above and other objects in view there is also provided, in accordance with a second embodiment of the invention, a payment authorization method, which comprises:

gathering, at a merchant's, account information for payment of a customer's purchase;

transmitting an authorization request to a financial authorization system requesting payment authorization for the customer's purchase, the authorization request including the account information;

calling a communications device associated with the customer and prompting the customer for confirmation or refusal of the transaction; and processing the authorization request in accordance with the customer's response by either refusing the transaction or processing the purchase.

In accordance with an alternative implementation of the invention the customer is required to enter their personal identifier (e.g., a PIN) upon being prompted. A proper PIN response is considered an authorization, while an incorrect PIN or no response at all is considered a refusal.

With the above and other objects in view there is also provided, in accordance with the invention, a charge card processing method, which comprises:

inputting a transaction request to a stationary merchant terminal disposed at a merchant location;

processing the transaction request with the merchant terminal, including a transmission of a first authorization request to a remote processing facility and receipt of a notification that authorization has been accepted or declined;

transmitting a second authorization request from a remote processing facility to a mobile communications device of a customer associated with the requested transaction via a wireless link; and authorizing the requested transaction only if authorization has been accepted for the first authorization request and a proper response has been received by the remote processing facility to the second authorization request.

With the above and other objects in view there is also provided, in accordance with the invention, a charge processing method, which comprises:

preauthorizing an imminent given transaction by transmitting a preauthorization for the imminent given transaction from a customer to a financial authorization system;

subsequently inputting a transaction request concerning the given transaction at a merchant terminal disposed at a merchant location;

processing the transaction request at the merchant terminal, including a transmission of an authorization request for the given transaction to the financial authorization system;

transmitting a response to the authorization request from the financial authorization system to the merchant terminal, and thereby authorizing the transaction request at the merchant's if the preauthorization from the customer is available in the financial authorization system, and otherwise contacting the customer for authorization or declining the authorization request.

In accordance with a concomitant feature of the invention, the preauthorization from the customer includes a maximum amount to be authorized for the transaction and a time period within which the preauthorization is valid.

Other features which are considered as characteristic for the invention are set forth in the appended claims.

Although the invention is illustrated and described herein as embodied in a credit card transaction notification and authorization system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
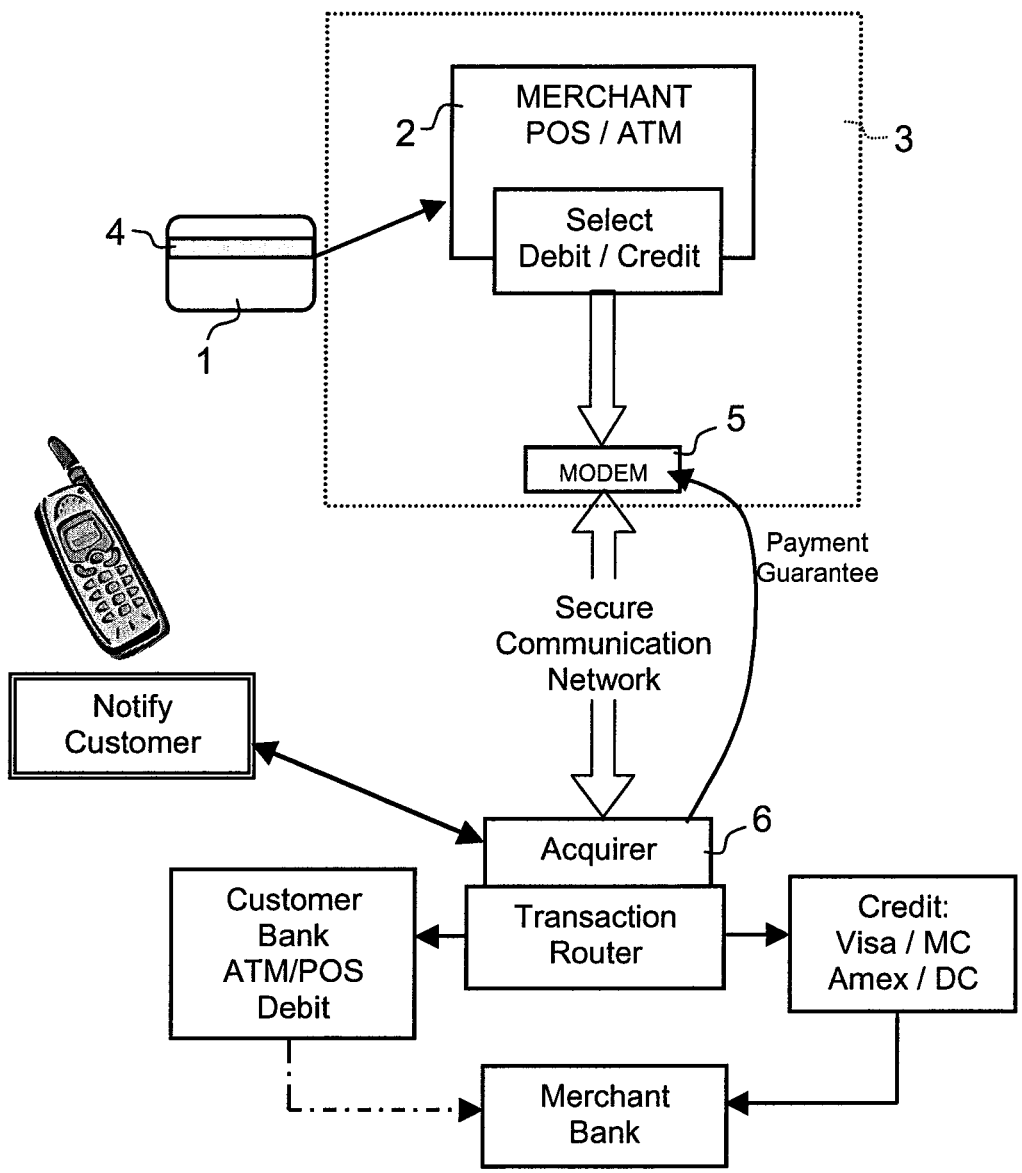
FIG. 1 is a schematic diagram illustrating a transaction according to the invention, in which the customer is notified immediately during the transaction.

Referring now to the figures of the drawing in detail and first, particularly, to FIG. 1 thereof, there is seen a simplified process stream in a cash-less sales transaction. A charge card 1 is swiped at a magnetic card reader 2 at a merchant terminal 3, or the card number is manually entered at the merchant terminal 3. The latter may represent a store, it may be a teller or an automated teller machine (ATM), or it may be a virtual terminal in an internet-type transaction. The cardholder, or the person swiping the card, may now be prompted to select a debit transaction or a credit transaction on the merchant terminal 3. If debit is selected, the cardholder enters the PIN associated with the card or with the account. If credit is selected, the cardholder is requested to sign for the purchase.

Prior to the customer's signing for the purchase, the merchant terminal 3 connects, through a modem 5, to an acquirer 6. The latter obtains the information from the modem 5 and checks against its data sources whether or not the transaction should be authorized. At the same time, a corresponding customer profile is checked as to the customer's set preferences concerning the notification/authorization options according to the invention.

Here, the customer's profile is set to simple "notification," which means that the system only notifies the cardholder by sending a message to his wireless device (e.g., cell phone). The message may be an audible message such as, for example, "%amount% charged on %date% at %merchant name%", or it may be an SMS (short message service) sent to the customer's phone. The customer's profile, however, may be set to any of several other options. For instance, the profile may be set to a simple notification, as above, followed by a prompt to confirm the purchase. The confirmation, again, may take any of several forms. For example, a simple "1" in answer to the confirmation request may be a code for authorization and a "2" may be a refusal. Or else, the customer may be prompted to enter a PIN or any set password which is stored in the customer profile. If the profile is set to authorization, the payment authorization and the payment guarantee are not provided. That is, the card transaction is declined at the merchant terminal 3.

The simple notification, of course, does not add any time to the transaction. If confirmation is required, the transaction is slightly extended. The added security, however, may well justify the delay. In either case, it is up to the customer to choose and set his profile accordingly.

The possible delay may be avoided by way of a further modification of the invention. Here, we provide for preauthorization when a charge request is imminent. By way of example: waiting in a checkout line, the customer may call "ahead" and provide preauthorization for the impending purchase. This may be entirely automated. The system will prompt the customer to identify a period of time for which the authorization is valid. For example, the purchase may be expected within 10 minutes and, accordingly, the customer will select, say, the half-hour authorization option. The system may also prompt for a maximum amount that would be authorized. For example, the purchase may be expected to cost $50.00 and, accordingly, the customer may set the maximum authorized amount to, say, $100.00. Proper preauthorization parameters may be empirically or statistically developed and the system may be set accordingly.

The process flow may be best understood by reference to a realistic example in a restaurant environment: The server has presented the customer a check, the customer has briefly reviewed the check, found the total amount of, say, $40.00 agreeable, and handed the server the check and the credit card. The server then moves to a backroom and processes the transaction, by swiping the card and entering the amount of $40.00 into a register terminal. Immediately upon receiving the authorization request, the credit card authorization system (e.g., the acquirer 6) sends an SMS message to the customer's cell phone. The customer receives the message telling him that the restaurant has requested authorization for a charge of $40.00. This happens well before the server returns with the transaction slip requesting the customer's signature.

When the final transaction is posted—the customer may have added a tip and the actual total may come out to, say, $48.00—the customer may or may not be notified again. This depends on the profile associated with the customer.

In the foregoing scenario, unfortunately, the customer's credit card is less than safe. It is possible, for example, for the server to swipe the card for one or two additional transactions, to be posted the next day or the next week. With the invention, the additionally swiped transactions would not be authorized, because the customer would decline. If only notification were requested according to the profile, the customer would still be alerted to the questionable transaction and could thus take the necessary countermeasure steps. Still in the same scenario, the credit card number and the name could be copied down very quickly. In addition, the three-digit security code could be copied down as well. The customer's credit card, while physically long returned to the customer, could now be used to make online and telephone purchases.

It will be understood that the foregoing scenario is merely exemplary and is in no way limiting with regard to the application of the instant invention (nor is it intended to be disparaging to the restaurant industry). Indeed, there exist numerous situations where proper customer notification and customer authorization may prevent fraudulent transactions and even wrongful transactions that are based on honest mistakes.

It will also be understood that the foregoing description is not only applicable to credit card processing, but also to debit and ATM card processing. The term "charge card" encompasses all of these cards and equivalent or similar payment mechanisms. For example, if cash is requested at an ATM (automated teller machine), the customer may be prompted to authorize the dispensing of the given amount via his cell phone, in addition to entering the PIN at the ATM terminal. In a further modification, however, it is possible to dispense with the prompt for the PIN entry at the terminal altogether and to only require the entry of a PIN through the customer's cell phone.

This leads to yet another modification or, rather, to a further application of the novel system according to the invention. It is possible for the customer profile to be set to notify (and/or require confirmation from) a third party. Such third party notification/confirmation may be beneficial in a parent/child relationship, or in an employer/employee relationship. The cell phone (or beeper, or equivalent wireless device) to which the notification is to be sent is set by the cardholder and it may be freely changed through secure access (e.g., by telephone through customer service, online through the Internet).

Figure 2:
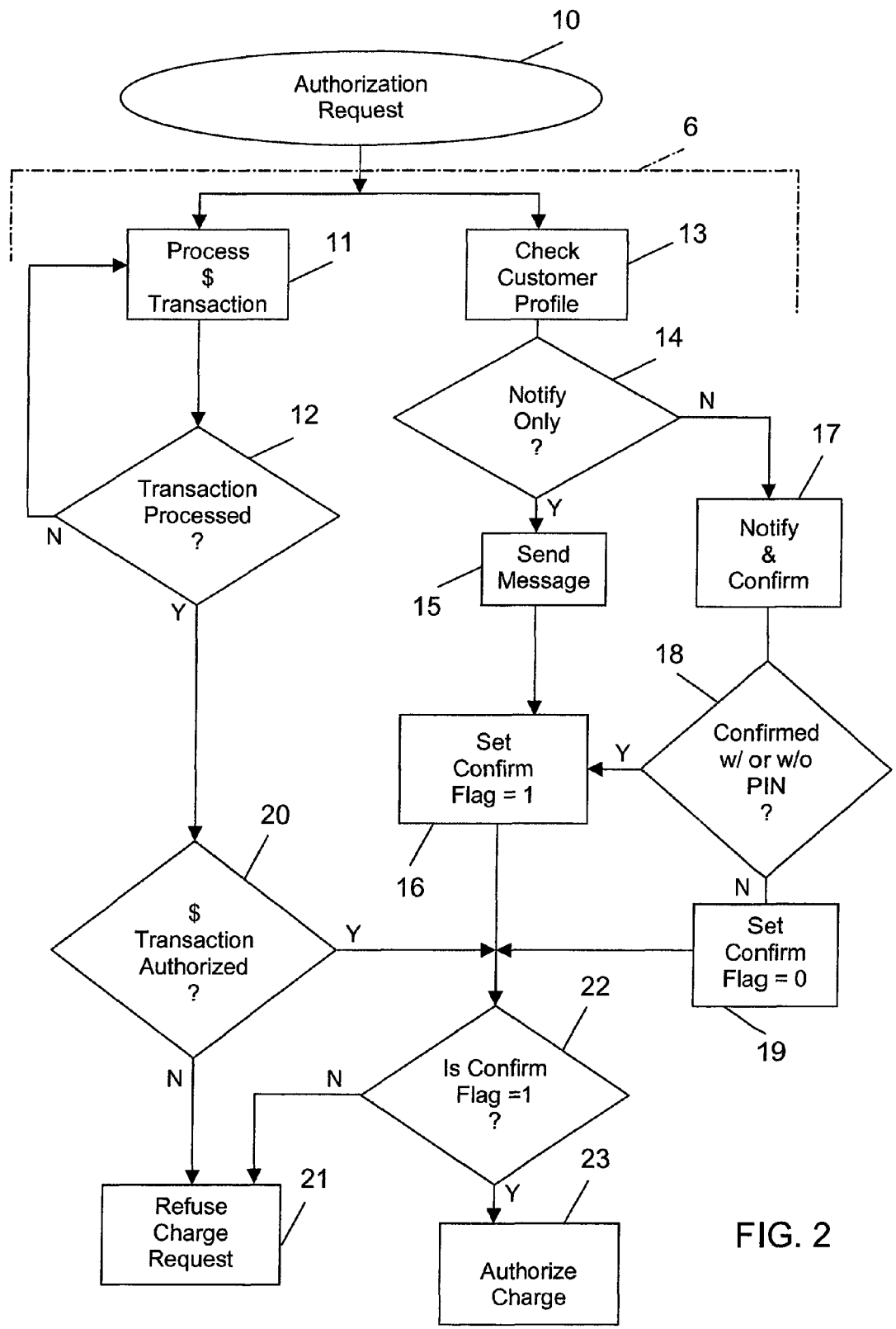
FIG. 2 is a flow diagram illustrating a method for charge request processing according to the invention.

Referring now briefly to FIG. 2, after the required information has been gathered at the merchant's (POS, ATM, online, telephone, etc.), an authorization request or charge request 10 is sent to the financial processing facility 6. There, the request is processed in a conventional manner as indicated by the boxes 11 and 12. At the same time, the customer profile associated with the account number is checked at 13. The customer profile may be set to "no action" or it may not be set at all. In that case, the right-hand branch is immediately terminated. If the profile is set to Notify Only, the query 14 returns a corresponding response and the customer's wireless device (e.g., cell phone or beeper) is notified at 15. The message may be an SMS message or it may be a voice announcement, depending on the customer profile. Once the notification has been sent at 15, a flag is set at 16.

If the customer profile is set to Notify & Confirm, the message to the customer's wireless device contains a message as above and a prompt for confirmation at 17. The confirmation may be a simple reply to an SMS message, it may consist of any key depressed (during a live call), or it may be a full fledged PIN or password. In a further modification, which adds yet another level of security, the customer may be prompted for a voice reply and the reply may then be subjected to "voice recognition" by comparing a frequency hysteresis chart associated with the customer to the voice reply.

If the customer (or the person in the possession of the wireless device) returns the proper response, the query 18 directs the process flow to the box 16, where the confirm flag is once more set to "1." If no response is received, or if an incorrect response is received, the confirm flag is set to "0" at 19.

At approximately the same time as the confirm flag is set to "1" or "0"—signifying proper or improper notification and/or proper customer side authorization—the financial transaction processing also has reached an end point at 20. If the transaction has been rejected, the merchant is notified accordingly by refusing the transaction at 21. If the financial transaction has been authorized at 20, the process queries whether or not the confirm flag has been set ("1") to indicate that the customer has been notified of the transaction and/or has authorized the transaction at 22. If the flag is not set ("0"), the transaction at the merchant's is refused. If the flag is set, the charge is authorized.

We claim:

1. A method for processing a transaction, comprising the steps of:
  receiving a request for authorizing a transaction for an account, said request received via a first transmission channel, said request including at least an identification of the customer's account;
  determining whether or not the account includes a request for notification to the customer of any transactions;
  notifying the customer via a second transmission channel only if the account includes a request for notification of any transactions;
  the second transmission channel being distinct from the first transmission channel; and
  authorizing the transaction without requiring a response from the customer.

2. The method according to claim 1, wherein the notifying step comprises sending an SMS message to the customer.

3. The method according to claim 1, wherein the request is from the group consisting of a customer, an account holder, an authorized person, and an unauthorized person .

4. The method according to claim 1, wherein the request is provided from the group consisting of an ATM, a POS terminal, a telephone and a device for virtual communication.

5. The method according to claim 1, wherein the request is a virtual request provided via the Internet.

6. The method according to claim 1, wherein the transaction is selected from the group consisting of credit card, debit card, charge card, and ATM.

7. The method according to claim 1, wherein the first transmission channel is selected from the group consisting of wireless and landline channels.

8. The method according to claim 1, which comprises receiving the request at a remote processing facility.

9. The method according to claim 1, wherein said steps of notifying and authorizing are performed substantially concurrently.

10. A method for processing a transaction, comprising the steps of:
  a. receiving a request for authorizing a transaction for an account, said request received via a first transmission channel, said request including at least an identification of the customer's account;
  b. determining if the account includes a request for notification to the customer of any transactions;
  c. sending a notification to the customer via a second transmission channel only if the account includes a request for notification of at least one form of transaction;
  d. the second transmission channel being distinct from the first transmission channel;
  e. receiving a response to the notification; and
  f. authorizing the transaction only if the response is proper.

11. The method according to claim 10, wherein the request is from the group consisting of a customer and an authorized person.

12. The method according to claim 10, wherein the request is provided from the group consisting of an ATM, a POS terminal, a telephone and virtual.

13. The method according to claim 10, wherein the transaction is selected from the group consisting of credit card, debit card, charge card, and ATM.

14. The method according to claim 10, wherein the first transmission channel is selected from the group consisting of wireless and landline channels.

15. The method according to claim 10, wherein the transaction is selected from the group consisting of credit cards, debit cards and ATM cards.

16. The method according to claim 10, wherein the first and second transmission channels are both wireless channels.

17. The method according to claim 10, wherein the request for authorizing a transaction is received from a merchant.

18. The method according to claim 10, wherein the request for authorizing a transaction is received from the group consisting of a merchant and a customer.

19. The method according to claim 10, wherein the response is selected from the group consisting of a reply to an SMS message, a key depressed during a telephone call, a PIN, a password, and a voice reply.

* * * * *